United States Patent Office 2,957,488
Patented Oct. 25, 1960

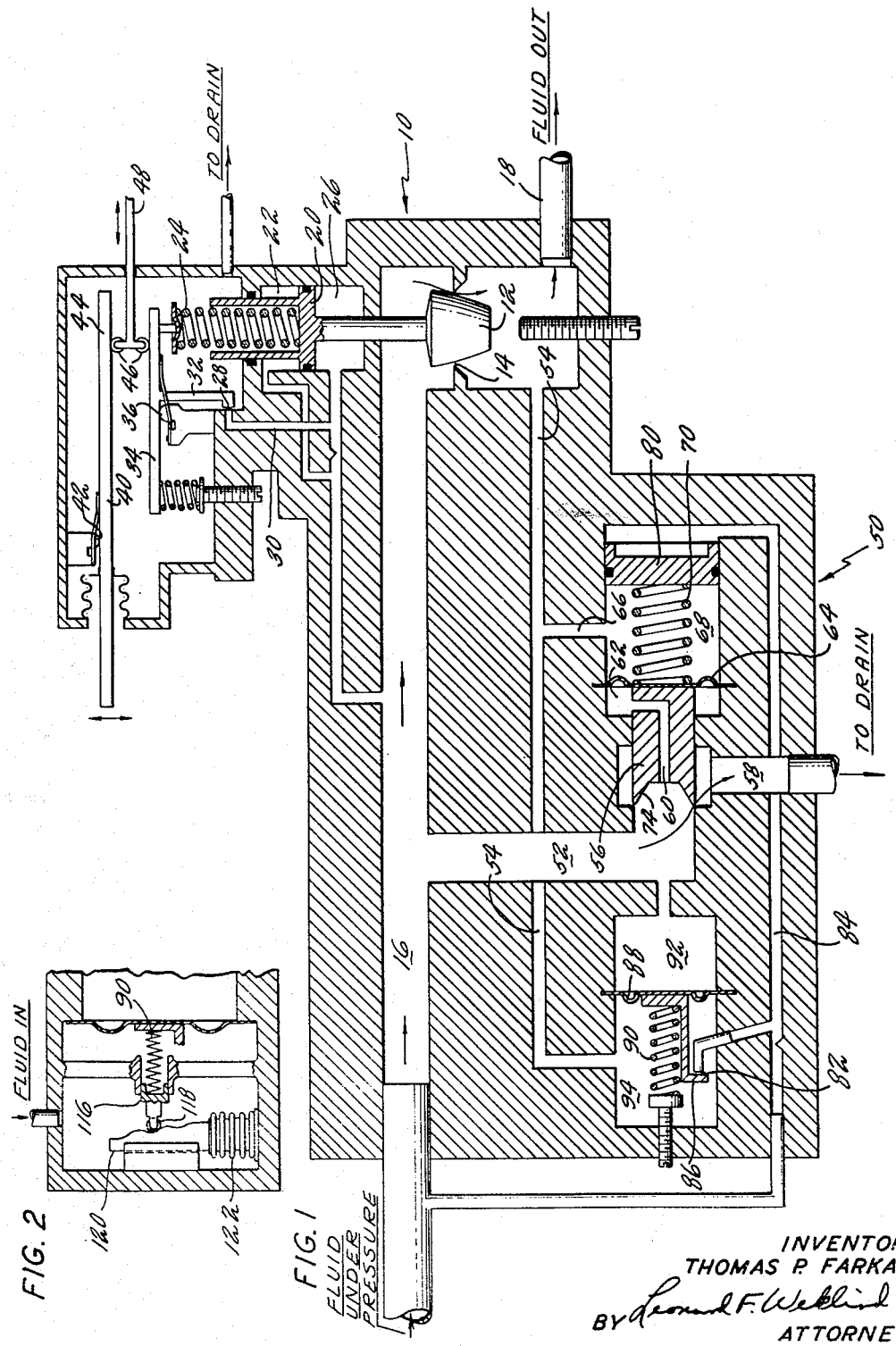

2,957,488

PRESSURE REGULATING SYSTEM

Thomas P. Farkas, Bloomfield, Conn., assignor to United Aircraft Corporation, East Hartford, Conn., a corporation of Delaware Filed Sept. 21, 1956, Ser. No. 611,339

13 Claims. (Cl. 137—117)

This invention relates to flow control devices and more particularly to devices wherein the pressure drop through the device is controlled.

It is an object of this invention to provide a fluid flow controlling device such as a throttle valve and a mechanism for regulating or maintaining constant the pressure drop across the throttle valve.

It is another object of this invention to provide a pressure regulating valve which includes means for compensating for errors caused by momentum forces, fluid dynamic forces and non-linear spring rates acting on the pressure regulating valve elements.

These and other objects of this invention will become readily apparent from the following detailed description of the drawing in which:

Fig. 1 illustrates schematically and in section one form of the invention; and

Fig. 2 illustrates in partial cross-section a modified form of the invention.

Referring to the drawing, a throttle valve is indicated at 10. The throttle valve 10 includes a movable valve element 12 which varies the area of the valve orifice 14. Fluid under pressure is supplied to the throttle valve by a conduit 16. After the fluid flows past the throttle valve, it is conducted to a fluid consuming device by means of a line 18.

The movable throttle valve element 12 is positioned by means of a servo piston 20 or any other suitable device. As shown herein fluid under throttle valve inlet pressure is conducted to the upper chamber 22 so that with the aid of the spring 24 the servo piston is urged in a downward direction. Fluid under throttle valve inlet pressure is also conducted to the lower chamber 26 on the bottom of the servo piston 20. The pressure in the chamber 26, however, is regulated by a variable orifice 28 which regulates the outflow from the line 30. The opening of the orifice 28 is varied by means of an element 32 which depends from a horizontal bar 34. The bar 34 pivots about the point 36 and may be controlled in any suitable manner. The bar 34 is shown here as being positioned by combination of two forces. A rod 40 which is pivoted at 42 may have its left end engaged with any suitable mechanism such that a controlling force may be produced in the right hand end 44 of the rod 40. The force at the right hand end 44 is transmitted to the rollers 46 which are carried by a translating member 48. The member 48 may be positioned by a second force transmitting device. The resulting force produced by the rod 40 and the member 48 is transmitted to the right hand end of bar 34 which in turn produces a given compression or force on the spring 24. Should there be any change in force on the top of the spring 24 as a result of any motion of the mechanism just described, the rod 34 will pivot about 36 so that the element 32 will vary the opening of the orifice 28. This in turn will vary the pressure in the lower chamber 26 to give the servo piston 20 a new position. This new position will cause a different compression force in the spring 24 to balance out the initial changing force just mentioned. The force multiplication mechanism and throttle valve servo system just described is shown and claimed in patent application Serial Number 528,878, filed August 17, 1955 by William E. Fortmann which has since matured into Patent No. 2,923,128 on February 2, 1960.

According to this invention in order to regulate the pressure drop across the throttle valve 10 a pressure regulator system generally indicated at 50 is provided. The pressure regulator system senses the pressure upstream of the throttle valve via the line 52 and the pressure on the downstream side of the throttle valve via the line 54. The pressure regulator system 50 has a primary valve element 56 for bypassing to drain a portion of the flow upstream of the throttle valve. The bypass fluid flows into the drain line 58. By regulating or bypassing the flow in this manner the pressure drop across the throttle valve may be regulated. Fluid under pressure on the upstream side of the throttle valve flows through the line 52 through the hollow passage 60 of the valve 56 into the chamber 62 on the left hand side of a diaphragm 64. Fluid under pressure from the downstream side of the throttle valve passes from the line 54 to the line 66 and then to the chamber 68 on the right hand side of the diaphragm 64. Thus, the diaphragm and the valve element 56 are urged to the right or an open position by fluid under pressure from upstream of the throttle valve and the same elements are urged towards the left by throttle valve downstream pressure and the spring 70.

The usual pressure regulating mechanisms usually included only the elements described immediately above. However, such a mechanism is subject to errors for various reasons. First of all, the momentum of the fluid flowing past the valve 56 creates a force on the left hand face 74 of the valve element 56. In addition, when the valve element 56 is in an open position, there is a pressure drop across the opening thereof, with the low pressure tending to move the valve element 56 toward the left. Other errors may also be introduced as a result of the rate of the backing spring 70.

In order to avoid these errors a movable servo piston 80 engages the right hand end of the spring 70. This piston 80 is actuated by servo pressure which is regulated by a variable orifice 82. The valve orifice 82 controls the bleed from a line 84 which receives fluid from the line 16 on the upstream of the main throttle valve element 12. The area of the orifice 82 is controlled by a member 86 which is moved by the pressures acting on the diaphragm 88 against the force of a spring 90. The chamber 92 on the right hand side of the diaphragm 88 receives fluid from the upstream side of the throttle valve by means of a line 52. The chamber 94 on the left hand side of the diaphragm 88 receives fluid under pressure from downstream side of the throttle valve by means of a line 54. The chambers 92 and 94 will be sensitive only to the pressure of the lines leading thereto. In other words there will be no fluid momentum forces acting on the diaphragm 88 since no fluid is flowing in and out of these chambers. As a result, the diaphragm 88 will be accurately positioned so as to consequently position the element 86 and vary the orifice opening 82. This in turn varies the pressure in the right hand side of the servo piston 80 to vary the position of the latter. Since the spring 90 is required to produce only very small increments of movement (to vary the area of the orifice 82) the spring load remains nearly constant thereby holding the regulated pressure nearly constant. Thus when any error in the regulated pressure drop across the throttle valve 12 exists, this error will show up on the diaphragm 88 which in turn will be urged to the right or left. Movement of the diaphragm in either direction opens or closes the orifice 82 thereby altering the pressure on the right hand side of the servo piston 80. This in turn causes a change in the spring force on the diaphragm 64 by action of the piston 80 and a correction in the regulated pressure is made by the new position of the pressure regulating valve element 56.

The pressure regulating valve element 56 immediately responds to large errors in regulated pressure and, following this, minor adjustments are made for better accuracy by means of the reset servo device, i.e., the servo piston 80 and the variable area orifice 82. It will be apparent that if the bypass or movable valve element 56 were wholly servo operated the response of the regulating system to large changes in flow would be slower because of the time lag inherent in any servo. With the system as shown, a large change in flow will be immediately felt by the bypass or valve element 56 because of the direct pressure sensing and at least a rough adjustment will be rapidly provided. The reset system 80, 82 will then act to provide accurate regulation by adjusting the spring 70 as required.

As seen in Fig. 2 a modified temperature compensating mechanism is illustrated. Thus the spring 90 of Fig. 1 is also shown in Fig. 2. The left end of spring 90 is engaged by a movable abutment 116 which carries a roller 118. The roller is a cam follower for following the irregular cam 120. The cam 120 is contoured so that at higher temperatures when the temperature responsive bellows 122 expands the response of the roller 118 and element 116 will be non-linear. It is known that at higher fuel temperatures the errors introduced into the flow system are non-linear.

If desired the temperature compensation or bias on spring 90 could be obtained by use of a bi-metallic element.

As a result of the invention it will be apparent that a simple yet highly accurate pressure regulating device has been provided. Furthermore, the regulator provides rapid response to large changes in pressure with the reset system making fine adjustments immediately after such major adjustments are made.

Although one embodiment of this invention has been illustrated and described herein, it will be apparent that various changes may be made in the construction and arrangement of the various parts without departing from the scope of the novel concept.

What it is desired by Letters Patent is:

1. In a pressure regulating system having a flow control valve including an opening, means for varying the opening of said control valve, valve means responsive to the fluid pressure on the upstream and downstream side of said control valve for maintaining substantially constant the pressure drop across said control valve including a backup spring, and second means for modifying the response of said pressure responsive valve means including a flapper valve means also responsive to the pressure on the upstream and downstream sides of said control valve, said second means varying the force exerted by said spring.

2. In a pressure regulating system having a flow control valve including an opening, means for varying the opening of said control valve, valve means including servo means responsive to the fluid pressure on the upstream and downstream side of said control valve for regulating the pressure drop across said control valve, said servo means including a backup spring, an abutment for said spring and means for modifying the response of said servo means including a second means responsive to the pressure on the upstream and downstream sides of said control valve, said second means varying the position of said abutment.

3. In a pressure regulating system having a flow control valve including an opening, means for varying the opening of said control valve, valve means including servo means responsive to the fluid pressure on the upstream and downstream side of said control valve for regulating the pressure drop across said control valve, said servo means including a backup spring, an abutment for said spring and means for modifying the response of said servo means including a second means responsive to the pressure on the upstream and downstream sides of said control valve, for varying the position of said abutment, a variable volume chamber partially formed by said abutment, a second servo formed by said abutment, and a control valve having a fluid connection to said chamber and being connected to said second pressure responsive means, whereby said control valve is operative in response to movement of said second means for regulating the pressure in said chamber.

4. In a control system for a fluid consuming device, a source of fluid under pressure, a main throttle valve for regulating the flow of fluid from said source to the device, a pressure regulating valve for maintaining substantially constant the pressure drop across said throttle valve including a movable servo member, means for connecting the sides of said member to the fluid pressure on the upstream and downstream side of said throttle valve respectively, a spring having one end engaging said member and urging said member in one direction, a second movable servo member engaging the other end of said spring, second control means responsive to said upstream and downstream pressures for regulating the pressure on one side of said second movable servo member.

5. In a control system for a fluid consuming device, a source of fluid under pressure, a main throttle valve for regulating the flow of fluid from said source to the device, a pressure regulating valve for maintaining substantially constant the pressure drop across said throttle valve including a movable servo member, means for connecting the sides of said member to the fluid pressure on the upstream and downstream side of said throttle valve respectively, a spring having one end engaging said member and urging said member in one direction, a second movable servo member engaging the other end of said spring, a second control means responsive to said upstream and downstream pressures for regulating the pressure on one side of said second movable servo member including a variable area orifice having a fluid connection to said second movable servo member.

6. In a control system for a fluid consuming device, a source of fluid under pressure, a main throttle valve for regulating the flow of fluid from said source to the device, a pressure regulating valve for maintaining substantially constant the pressure drop across said throttle valve including a movable servo member, means for connecting the sides of said member to the fluid pressure on the upstream and downstream side of said throttle valve respectively, a spring having one end engaging said member and urging said member in one direction, a second movable servo member engaging the other end of said spring, second control means including means responsive to the pressures on the upstream and downstream side of said throttle valve, said second control means regulating the pressure on one side of said second movable servo member to oppose the force of said spring.

7. In a control system for a fluid consuming device, a source of fluid under pressure, a main throttle valve for regulating the flow of fluid from said source to the device, a pressure regulating valve for maintaining substantially constant the pressure drop across said throttle valve including a movable servo member, means for connecting the sides of said member to the fluid pressure on the upstream and downstream side of said throttle valve respectively, a spring having one end engaging said member and urging said member in one direction, a second movable servo member engaging the other end of said spring, means for conducting fluid from said source to one side of said second member to position the latter, a flapper valve for regulating the flow to said one side of said second member, and means for controlling said flapper valve.

8. In a control system according to claim 7 wherein said last mentioned means is responsive to the upstream and downstream pressures of said throttle valve.

9. In a control system for a fluid consuming device, a source of fluid under pressure, a main throttle valve for regulating the flow of fluid from said source to the device, a pressure regulating valve for controlling the pressure drop across said throttle valve including a movable servo member, means for connecting the sides of said member to the fluid pressure on the upstream and downstream side of said throttle valve respectively, a spring having one end engaging said member and urging said member in one direction, a second movable servo member engaging the other end of said spring, means for conducting fluid from said source to one side of said second member to position the latter, a second valve for regulating the flow to said one side of said second member, means for controlling said second valve, including a second spring urging said valve in one direction, and means responsive to the temperature of the fluid being controlled for varying the compression of said second spring.

10. In a pressure regulating system having a flow control valve including an opening, means for varying the opening of said control valve, valve means including servo means responsive to the fluid pressure on the upstream and downstream side of said control valve for regulating the pressure drop across said control valve, said servo means including a backup spring, an abutment for said spring, means for modifying the response of said servo means including a second means responsive to the pressure on the upstream and downstream sides of said control valve, said second means varying the position of said abutment, and temperature responsive means for further regulating said second means to provide a non-linear response of said second means with variation of the temperature of the fluid being controlled.

11. In a control system for a fluid consuming device, a source of fluid under pressure, a main throttle valve for regulating the flow of fluid from said source to the device including an orifice, a servo operated movable element for varying the area of said orifice, a pressure regulating valve for maintaining constant the pressure drop across said throttle valve including a servo member, a servo piston fixed to said movable element, means for connecting one of the sides of said piston directly to the fluid pressure on the upstream side of said throttle valve, means for connecting the other side of said piston with the upstream side of said piston including a fixed orifice, a flapper valve connecting said other side of said piston to drain, said servo member including a spring having one end engaging said servo member and urging said servo member in one direction, a back-up piston engaging the other end of said spring, means for conducting fluid from said source to one side of said back-up piston to position the latter, a second valve for regulating the flow to one side of said back-up piston, a pressure differential device for controlling said second valve, including a spring urging said valve in a closed direction, and means responsive to the pressures on the upstream and downstream sides of said throttle valve for operating said pressure differential device.

12. In a control system for a fluid consuming device, a source of fluid under pressure, a main throttle valve for regulating the flow of fluid from said source to the device including an orifice, a servo operated movable element for varying the area of said orifice, a pressure regulating valve for maintaining constant the pressure drop across said throttle valve including a servo member, a servo piston fixed to said movable element, means for connecting one of the sides of said piston directly to the fluid pressure on the upstream side of said throttle valve, means for connecting the other side of said piston with the upstream side of said piston including a fixed orifice, a flapper valve connecting said other side of said piston to drain, said servo member including a spring having one end engaging said servo member and urging said servo member in one direction, a back-up piston engaging the other end of said spring, means for conducting fluid from said source to one side of said back-up piston to position the latter, said regulating means including bypass means connected to said servo member for bypassing a portion of the fluid from the upstream side of said throttle valve, a second valve for regulating the flow to one side of said back-up piston, a pressure differential device for controlling said second valve, including a spring urging said valve in a closed direction, means responsive to the pressures on the upstream and downstream sides of said throttle valve for operating said pressure differential device, and means responsive to the temperature of the fluid being controlled for varying the compression of said spring.

13. In a control system for a fluid consuming device, a source of fluid under pressure, a main throttle valve for regulating the flow of fluid from said source to the device, a pressure regulating valve for maintaining substantially constant the pressure drop across said throttle valve including a first movable servo member, means for connecting the sides of said member to the fluid pressure on the upstream and downstream side of said throttle valve respectively, a second movable servo member for varying the response of said first servo member, force transmitting means interconnecting said first and second servo members, means for conducting fluid under pressure to one side of said second movable servo member, means responsive to at least one pressure in the system for regulating the pressure on said one side of said second movable servo member, and a temperature responsive element for varying the effect of said means responsive to one pressure.

References Cited in the file of this patent

UNITED STATES PATENTS

| | | |
|---|---|---|
| 2,616,254 | Mock | Nov. 4, 1952 |
| 2,638,742 | Carey | May 19, 1953 |
| 2,765,800 | Drake | Oct. 9, 1956 |
| 2,806,519 | Basford et al. | Sept. 17, 1957 |

FOREIGN PATENTS

| | | |
|---|---|---|
| 771,955 | France | Aug. 6, 1934 |
| 735,159 | Great Britain | Aug. 17, 1955 |